United States Patent
Shikata et al.

(10) Patent No.: US 10,688,917 B2
(45) Date of Patent: Jun. 23, 2020

(54) LIGHTING CONTROL APPARATUS FOR VEHICULAR LAMP, VEHICULAR LAMP SYSTEM

(71) Applicants: Stanley Electric Co., Ltd., Tokyo (JP); Mazda Motor Corporation, Hiroshima (JP)

(72) Inventors: Satoshi Shikata, Tokyo (JP); Atsushi Yoshida, Hiroshima (JP)

(73) Assignees: STANLEY ELECTRIC CO., LTD., Tokyo (JP); MAZDA MOTOR CORPORATION, Hiroshima (JP)

(*) Notice: Subject to any disclaimer, the term of this patent is extended or adjusted under 35 U.S.C. 154(b) by 0 days.

(21) Appl. No.: 16/310,720

(22) PCT Filed: Jun. 2, 2017

(86) PCT No.: PCT/JP2017/020663
§ 371 (c)(1),
(2) Date: Dec. 17, 2018

(87) PCT Pub. No.: WO2017/217260
PCT Pub. Date: Dec. 21, 2017

(65) Prior Publication Data
US 2019/0143887 A1 May 16, 2019

(30) Foreign Application Priority Data
Jun. 15, 2016 (JP) .................................. 2016-118567

(51) Int. Cl.
*B60Q 1/00* (2006.01)
*B60Q 1/38* (2006.01)
(Continued)

(52) U.S. Cl.
CPC ................. *B60Q 1/38* (2013.01); *B60Q 1/34* (2013.01); *H05B 45/00* (2020.01); *H05B 45/10* (2020.01); *H05B 47/16* (2020.01)

(58) Field of Classification Search
None
See application file for complete search history.

(56) References Cited

U.S. PATENT DOCUMENTS 7,332,877 B2 * 2/2008 Crodian ............... B60Q 1/1423
315/292
2018/0043820 A1 * 2/2018 Murakami .............. F21S 41/00

FOREIGN PATENT DOCUMENTS

EP 1594346 A2 11/2005
JP 2007-287476 A 11/2007
(Continued)

OTHER PUBLICATIONS

The International Search Report and Written Opinion for PCT/JP2017/020663 dated Aug. 22, 2017.
(Continued)

*Primary Examiner* — Dedei K Hammond
(74) *Attorney, Agent, or Firm* — Kenealy Vaidya LLP

(57) ABSTRACT

To achieve improved visibility and alleviation of discomfort during light emission of a vehicular lamp using LEDs. The vehicular lamp includes a control part for outputting a control signal indicating light luminous intensity emitted from a light source and a light source driving part for driving the light source based on the control signal, where the light emitted from the light source driven by the light source driving part repeats a predetermined luminous intensity change pattern at a predetermined cycle, and where the predetermined luminous intensity change pattern includes a first section where the luminous intensity is increased instantaneously from a lowest to a highest value, a second section where the luminous intensity is maintained at the highest
(Continued)

value, a third section where the luminous intensity is decreased from the highest to the lowest value, and a fourth section where the luminous intensity is maintained at the lowest value.

13 Claims, 4 Drawing Sheets

(51) Int. Cl.
*B60Q 1/34* (2006.01)
*H05B 45/00* (2020.01)
*H05B 45/10* (2020.01)
*H05B 47/16* (2020.01)

(56) References Cited

FOREIGN PATENT DOCUMENTS

| | | |
|---|---|---|
| JP | 2008-189216 A | 8/2008 |
| JP | 2014-139941 A | 7/2014 |
| WO | 2009019945 A1 | 2/2009 |

OTHER PUBLICATIONS

The extended European Search Report for the related European Patent Application No. 17813162.9 dated Oct. 8, 2019.
Apr. 21, 2020 Office Action from related Japanese Patent Application No. 2016 118567 showing initial citation of Japanese Patent Publication No. 2008-189216A.

* cited by examiner

FIG.4

UNIT: (millisecond)

| | EVALUATORS | | | | | | | AVERAGE* |
|---|---|---|---|---|---|---|---|---|
| | a | b | c | d | e | f | g | |
| t1min | 40 | 40 | 40 | 40 | 40 | 40 | 40 | 40 |
| t2max | 580 | 580 | 580 | 620 | 580 | 620 | 620 | 596 |
| t1max (t2=460) | 340 | 340 | 340 | 340 | 340 | 340 | 340 | 340 |
| t2min (t1=100) | 260 | 260 | 260 | 220 | 260 | 260 | 260 | 260 |

* AVERAGE OBTAINED EXCLUDING MAX AND MIN VALUE

LIGHTING CONTROL APPARATUS FOR VEHICULAR LAMP, VEHICULAR LAMP SYSTEM

BACKGROUND OF THE INVENTION

Field of the Invention

The present invention relates to a technique for controlling the flashing of vehicular lamps used for applications such as turn signal lamps.

Description of the Background Art

A prior art of vehicular lamps used as turn signal lamps (winkers) is disclosed in, for example, Japanese Unexamined Patent Application Publication No. 2014-139941 (hereinafter referred to as "Patent Document 1"). This prior art is intended, when a pair of headlights, turn signal lamps or the like are configured using LEDs, to alleviate a sense of discomfort felt by an observer due to the difference between the luminance changing characteristics of LEDs and that of light bulbs. Specifically, the above-mentioned sense of discomfort by the observer occurs because the lamps using light bulbs have luminance changing characteristics where light emission rising speed is slow and light emission falling speed is gradual whereas the lamps using LEDs do not have such luminance changing characteristics. For this reason, in the prior art disclosed in Patent Document 1, the flashing of the LEDs is controlled by the light energy change to imitate the rise and fall of the light emission of light bulbs. (Refer to paragraphs 0014, 0015, etc. in Patent Document 1.)

Now, since a semiconductor light emitting device such as a LED inherently has a steep luminance changing characteristics, it is conceivable that this characteristics can contribute to visibility improvement when used as a turn signal or the like if it is used to its advantage.

However, since the prior art disclosed in Patent Document 1 merely imitates the luminance changing characteristics of light bulbs, it is no different from using actual light bulbs from the viewpoint of visibility improvement.

In a specific aspect, it is an object of the present invention to provide a technique capable of achieving both improved visibility and alleviation of discomfort during light emission of vehicular lamps using LEDs or the like.

SUMMARY OF THE INVENTION

A lighting control apparatus according to one embodiment of the present invention is an apparatus for controlling the flashing of a light source used as a vehicular lamp having a semiconductor light emitting device including (a) a control part for generating and outputting a control signal indicating luminous intensity of light emitted from the light source and (b) a light source driving part for driving the light source based on the control signal provided from the control part where (c) the light emitted from the light source driven by the light source driving part based on the control signal repeats a predetermined luminous intensity change pattern at a predetermined cycle, and where (d) the predetermined luminous intensity change pattern includes (i) a first section where the luminous intensity is substantially increased instantaneously from a lowest value to a highest value, (ii) a second section following the first section where the luminous intensity is maintained at the highest value, (iii) a third section following the second section where the luminous intensity is gradually decreased from the highest value to the lowest value, and (iv) a fourth section following the third section where the luminous intensity is maintained at the lowest value.

According to the configuration as stated above, during light emission of vehicular lamps using LEDs or the like, improved visibility and alleviation of discomfort can both be achieved.

BRIEF DESCRIPTION OF THE DRAWINGS

FIG. 4 is a diagram showing a sensory evaluation result regarding preferred values of the time length of each section of luminous intensity change.

DESCRIPTION OF THE PREFERRED EMBODIMENTS

Figure 1:
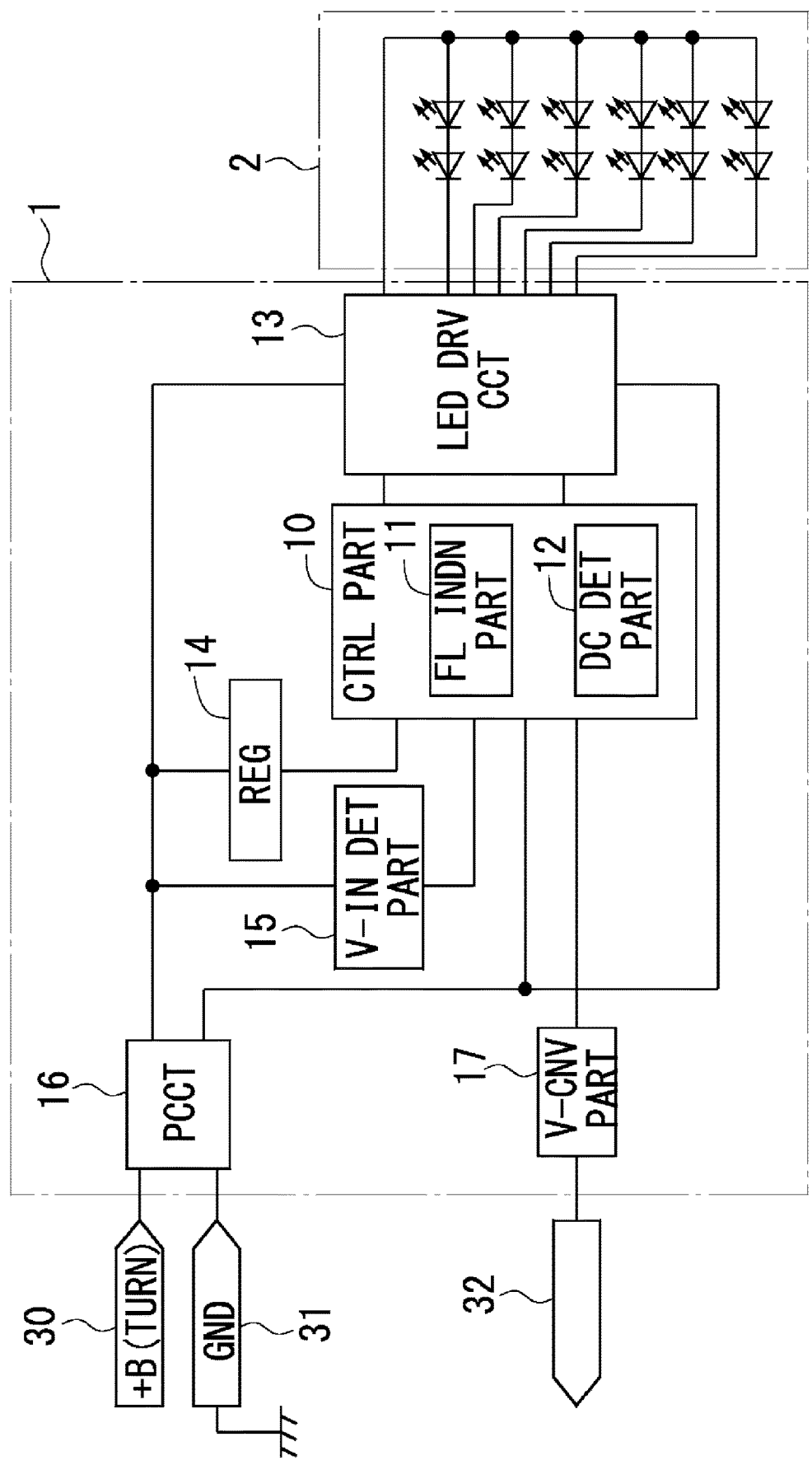
FIG. 1 is a diagram showing a configuration of a vehicular lamp system according to one embodiment.

FIG. 1 is a diagram showing a configuration of a vehicular lamp system according to one embodiment. The illustrated vehicular lamp system is used as a turn signal lamp (a turn lamp) of a vehicle, and is configured to include a lighting control device 1 and a light source 2 that is subjected to lighting control by the lighting control device 1.

The lighting control device 1 is configured to include a control part 10, a LED driving circuit 13, a regulator 14, an input voltage detecting part 15, a protection circuit 16, and a voltage conversion part 17 (which are abbreviated as CTRL PART 10, LED DRV CCT 13, REG 14, V-IN DET PART 15, PCCT 16, V-CNV PART 17 in FIG. 1, respectively). Further, the light source 2 is configured to include one or more LEDs (semiconductor light emitting devices).

The control part 10 is realized, for example, by a microcomputer executing a predetermined operation program, and it controls the overall operation of the lighting control device 1. The control part 10 includes a flashing indication part 11 and a disconnection detecting part 12 as function blocks (which are abbreviated as FL INDN PART 11, DC DET PART 12 in FIG. 1, respectively).

The flashing indication part 11 outputs a control signal to the LED driving circuit 13 for controlling the flashing state of the light source 2. Specifically, for example, in a case where the LED driving circuit 13 controls the light intensity of the light source 2 according to the magnitude of the electric current, the flashing indication part 11 outputs a control signal indicating the electric current corresponding to the desired light intensity.

The disconnection detecting part 12 detects disconnection of the circuit of the light source 2 if disconnection occurs, and outputs a disconnection detection signal to the flashing indication part 11. Upon receiving the disconnection detection signal, the flashing indication part 11 outputs a control signal to the LED driving circuit 13 in order to stop the power supply to the light source 2, for example.

The LED driving circuit 13 supplies driving power to the light source 2 in order to flash the respective LEDs of the light source 2 based on the control signal outputted from the flashing indication part 11 using power (for example, power supplied from the vehicle battery) supplied via the high potential terminal 30 and the reference potential terminal 31.

The regulator 14 converts the voltage supplied via the high potential terminal 30 and the reference potential terminal 31 into a low potential voltage (for example, +5V) suitable for the operation of the control part 10 and supplies thereto. The regulator 14 incorporates a watchdog timer for monitoring abnormal operation of the control part 10.

The input voltage detecting part 15 detects the voltage and outputs a detection signal to the control part 10 when the voltage supplied via the high potential terminal 30 and the reference potential terminal 31 falls below a predetermined threshold.

The protection circuit 16 is connected to the high potential terminal 30 and the reference potential terminal 31 to protect the light source 2 when the light source 2 is reversely connected or to prevent surge voltage from flowing into the lighting control device 1 or the light source 2.

The voltage conversion part 17 converts the voltage of the disconnection detection signal into a predetermined value and outputs the voltage to terminal 32 when the disconnection detection signal is outputted from the disconnection detecting part 12. The disconnection detection signal outputted to the terminal 32 is used, for example, to turn on a warning light provided on the instrument panel of the vehicle.

Figure 2A:
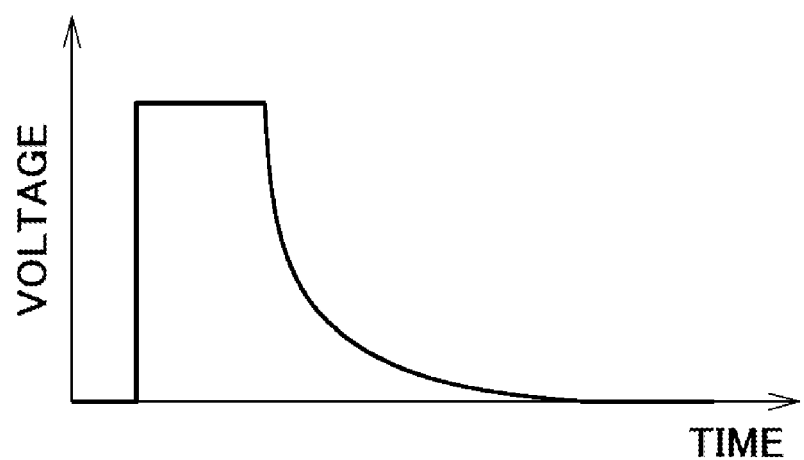
FIGS. 2A and 2B are diagrams for explaining the method of controlling the flashing of a vehicular lamp by the flashing indication part.
Figure 2B:
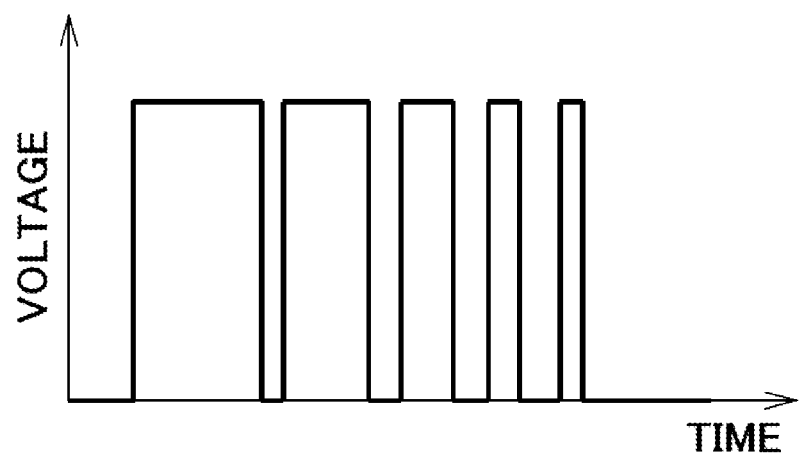

FIGS. 2A and 2B are diagrams for explaining the method of controlling the flashing of a vehicular lamp by the flashing indication part. For example, if the LED driving circuit 13 is capable of controlling the electric current of the light source 2, then the flashing indication part 11 supplies a variable voltage control signal indicating the electric current value corresponding to the desired luminous intensity of light to the electric current control terminal of the LED driving circuit 13, as shown in FIG. 2A. Thereby, the LED driving circuit 13 drives the light source 2 with the electric current having the magnitude corresponding to the control signal. On the other hand, for example, if the LED driving circuit 13 is capable of performing pulse width modulation (PWM) control of the light source 2, then the flashing indication part 11 supplies a variable pulse width control signal indicating the electric current value corresponding to the desired luminous intensity of light to the PWM control terminal of the LED driving circuit 13, as shown in FIG. 2B. Thereby, the LED driving circuit 13 drives the light source 2 with the PWM controlled electric current having the magnitude corresponding to the control signal.

Figure 3:
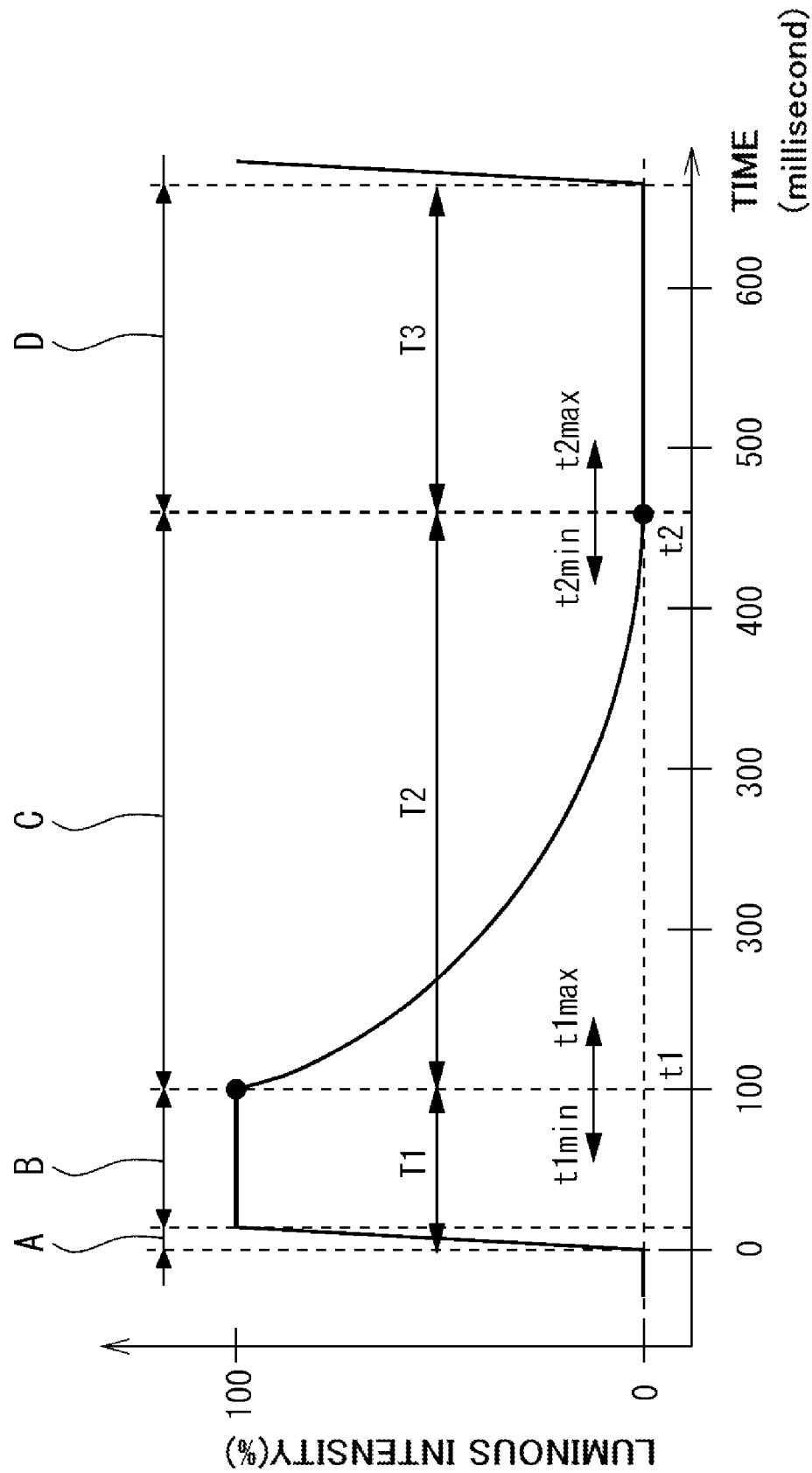
FIG. 3 is a diagram showing temporal changes of the luminous intensity of light emitted from the light source.

FIG. 3 is a diagram showing temporal changes of the luminous intensity of light emitted from the light source. In the present embodiment, the LED driving circuit 13 drives the light source 2 so that the light flashes periodically and repeatedly from the light source 2. And FIG. 3 shows one cycle of the luminous intensity change of the light flashing periodically and repeatedly. As shown in the figure, one cycle of the luminous intensity change includes four sections A, B, C, and D.

In Section A, the luminous intensity substantially changes from 0% to 100% instantaneously from the starting point (at zero seconds) of the cycle. Specifically, the time length of Section A corresponds to the rise time where the luminous intensity of light emitted from the light source 2 changes from 0% to 100% due to factors such as the time lag in the operation of the circuit which is inevitably generated.

The time length required for Section A is the time corresponding to the rise time of the LEDs included in the light source 2 at the time of light emission and is therefore much shorter than the time length corresponding to one cycle. In the present embodiment, for example, a range of 1 Hz to 2 Hz is assumed as the repetition frequency of light, and one cycle in this case becomes 0.5 seconds to 1 second (500 milliseconds to 1000 milliseconds). On the other hand, the time length of Section A is, for example, about several hundred microseconds to about 1 ms (millisecond). That is, the time length of Section A is set equal to or less than 1/500 of the time length of one cycle.

Herein, in this specification, "luminous intensity 100%" is defined as a state in which the luminous intensity set as the maximum value is being emitted during normal operation of flashing the light source 2, and for example refers to a state in which the rated maximum luminous intensity of each LED of the light source 2 is being emitted. Also, in this specification, "luminous intensity 0%" is defined as a state in which light is being turned off during normal flashing operation of the light source 2, and for example refers to a state in which each LED of the light source 2 is turned off or a state in which the luminous intensity is reduced to such an extent that human eyes can not perceive the lighting.

Section B is the section following Section A, and is the section in which the state (luminous intensity 100%) is maintained after the luminous intensity of the light emitted from the light source reaches 100%. Section B starts from the end point of Section A and continues until time t1 which is a predetermined end point. Here, although it is possible that the luminous intensity actually increases or decreases due to an increase or decrease in the power supply, even if such intrinsically unintended increase or decrease in luminous intensity occurs, the state of the luminous intensity 100% shall be deemed to be maintained. Specifically, when the luminous intensity is maintained within the range of ±10% on the basis of the maximum value of the luminous intensity set at the time during which the light source 2 is flashing, the state of the luminous intensity 100% shall be assumed, for example.

Section C is the section following Section B and is the section in which the luminous intensity of the light emitted from the light source gradually decreases from 100% to 0%. Section C starts from time t1 which is the end point of Section B and continues until time t2 which is a predetermined end point. As shown in the figure, it is preferable that the time length of Section C is longer than the total time length of Sections A and B, and it is preferable to set the time length of Section C to be equal to or greater than three times of the total time length of Sections A and B. Here, in the example shown in the figure, in Section C, the change in luminous intensity forms a curved line where the decrease rate of the luminous intensity at the starting point is large and the decrease rate gradually decreases toward the end point of the section, but is not limited thereto. For example, the change in luminous intensity may form a curved line where the decrease rate of the luminous intensity at the starting point is small and the decrease rate increases toward the end point of the section, or the change in luminous intensity may form a straight line where the decrease rate is constant.

Section D is the section following Section C, and is the section in which the state where luminous intensity 0% is maintained after the light emitted from the light source reaches 0%. Section D starts from time t2 which is the end point of Section C and continues until the end point of one cycle. After the end point of Section D, Section A of the next cycle follows.

In the vehicular lamp system of the present embodiment, the features of luminous intensity change in one cycle described above are as follows. Firstly, in Section A and Section B, utilizing the steepness of rise in light emission which is the intrinsic feature of each LED included in the light source 2, the luminous intensity is promptly set to the state of luminous intensity 100% and this state is maintained. Thereby, it is possible to obtain visibility equivalent to that of a turn signal lamp using the conventional LEDs. That is, it is possible to allow the observer to notice the flashing of the turn signal lamp sooner.

Here, in a turn signal lamp that drives LEDs by using a simple rectangular wave as a driving method, since the state of luminous intensity 100% continues from the turn-on time till the turn-off time, the total amount of light within one cycle (the integrated value of the amount of light) becomes large which makes the observer feel a strong glare when viewing the lamp. On the other hand, in Section C, since the luminous intensity is gradually reduced from 100% to 0%, the glare is reduced. Furthermore, since Section D maintains the luminous intensity in the 0% state, Section A in the following cycle (the section where the lamp is turned on instantaneously) becomes more distinguishable and the flashing becomes easier to recognize. Thus, it is possible to realize an eye friendly flashing state for the observer.

Further, when viewing Sections A to D as a whole, since the luminous intensity gradually decreases over a relatively long time after the luminous intensity steeply rises, unlike the conventional change in the luminous intensity of the turn signal lamp using LEDs, a new flashing light emission expression which is different from the change in luminous intensity of a turn signal lamp using light bulbs or a turn signal lamp imitating the light bulbs is realized.

FIG. 4 is a diagram showing a sensory evaluation result regarding preferred values of the time length of each section of luminous intensity change. Here, the preferred values for the time length of each section were evaluated by seven evaluators. In the evaluation, the time length of each section was set variably and the minimum time unit was set to 10 ms. In addition, the maximum value and the minimum value among the sets of data obtained from each of the seven evaluators were excluded and five data were used to calculate the average. Also, reference values at time t1 and time t2 in the luminous intensity change were set to 100 ms and 460 ms, respectively. Further, the time length required for Section A was about 0.2 ms. Further, in the following evaluation, one cycle was set to 667 ms which corresponds to a frequency of 1.5 Hz.

Time t1min is the result of evaluating the preferred minimum value at the end point time t1 of Section B (the second section). Here, time t1 was decreased from 100 ms in increments of 10 ms, and the evaluation was carried out by seven evaluators. The evaluation criterion here is whether or not each evaluator felt that "the light is clearly dark or hard to notice" in Sections A and B. When the evaluation results of these evaluators were averaged, the value of time t1min=40 ms was obtained. From this result, it is understood that the preferred minimum value of the total time T1 of Sections A and B which is from time 0 to time t1 is 40 ms.

Time t2max shows the result of evaluating the preferred value as the maximum value of the end point time t2 in Section C (the third section) while time t1 is fixed at 100 ms. Here, time t2 was increased from 460 ms in increments of 10 ms, and the evaluation was carried out by seven evaluators. The evaluation criteria here is whether or not each evaluator felt that "the flashing of light is clearly hard to recognize" in Section C. When the evaluation results of these evaluators were averaged, a value of time t2max=596 ms was obtained. From this result, it is understood that the preferred maximum value of time T2 in Section C which is from time t1 to time t2 is 496 ms (=596 ms−100 ms).

Time t1max is the result of evaluating the preferred maximum value at the end point time t1 of Section B while time t2 is fixed at 460 ms. Here, time t1 was increased from 100 ms in increments of 10 ms, and the evaluation was carried out by seven evaluators. The evaluation criterion here is whether or not each evaluator felt that the light "does not seem to gradually disappear (gradual decrease of amount of light)" in Section C where the time length becomes relatively short as time t1 increases. When the evaluation results of these evaluators were averaged, a value of time t1max=340 ms was obtained. From this result, it is understood that the preferred minimum value of time T2 in Section C which is from time t1 to time t2 is 120 ms (=460 ms−340 ms). In other words, from this result, it is preferable that the minimum value of time T2 of Section C be equal to or greater than three times the minimum value of the total time T1 of Sections A and B.

Time t2 min is the result of evaluating the preferred minimum value at the end point t2 of Section C while time t1 is fixed at 100 ms. Here, time t2 was decreased from 460 ms in increments of 10 ms, and the evaluation was carried out by seven evaluators. The evaluation criterion here is whether or not each evaluator felt that the light "does not seem to gradually disappear (gradual decrease of amount of light)" in Section C where the time length becomes relatively short as time t2 decreases. When the evaluation results of these evaluators were averaged, a value of time t2min=260 ms was obtained. From this result, it is understood that the preferred minimum value of time T2 in Section C which is from time t1 to time t2 is 160 ms (=260 ms−100 ms). In other words, from this result, it is preferable that the minimum value of time T2 of Section C be equal to or greater than four times the minimum value of the total time T1 of Sections A and B.

Here, in the above evaluation, the time length of one cycle was set to 667 ms (corresponding to a frequency of 1.5 Hz), but the time length of one cycle can be set ranging from 500 ms (corresponding to a frequency of 2 Hz) to 1000 ms (corresponding to a frequency of 1 Hz) where the above-stated preferred values remain effective. This is because even when the time length of one cycle changes, the time corresponding to the difference between the time length of one cycle and the total time (T1+T2) of Sections A to C can be set as the time length of time T3 of Section D (the fourth section).

According to the embodiment as described above, the luminous intensity steeply rises and is kept at the maximum value for a certain period of time thereafter, thereby improving the visibility for the observer. Further, thereafter, the luminous intensity gradually decreases within a certain period of time to reach the minimum value and is kept at the minimum value thereafter, thereby alleviating a sense of discomfort felt by the observer. Therefore, during light emission of vehicular lamps using LEDs or the like, improved visibility and alleviation of discomfort can both be achieved.

It should be noted that this invention is not limited to the subject matter of the foregoing embodiment, and can be implemented by being variously modified within the scope of the present invention as defined by the appended claims. For example, in the above-described embodiment, a turn signal lamp is disclosed as an example of a vehicular lamp, but the scope of the present invention is not limited to such application.

What is claimed is:

1. A lighting control apparatus for a vehicular turn signal lamp for controlling the flashing of a light source used as a vehicular turn signal lamp having a semiconductor light emitting device comprising:
   a control part for generating and outputting a control signal indicating luminous intensity of light emitted from the light source and
   a light source driving part for driving the light source based on the control signal provided from the control part,
   wherein the light emitted from the light source driven by the light source driving part based on the control signal repeats a predetermined luminous intensity change pattern at a predetermined cycle, and
   wherein the predetermined luminous intensity change pattern comprises:
   (i) a first section where the luminous intensity is substantially increased instantaneously from a lowest value to a highest value,
   (ii) a second section following the first section where the luminous intensity is maintained at the highest value,
   (iii) a third section following the second section where the luminous intensity is gradually decreased from the highest value to the lowest value, and
   (iv) a fourth section following the third section where the luminous intensity is maintained at the lowest value, and
   wherein, in the first section, the luminous intensity changes from the lowest value to the highest value in the length of time equal to or less than 1/500 of the time length of the predetermined cycle, and
   wherein the length of time of the third section is set equal to or greater than 120 milliseconds, and
   wherein the third section where a change in luminous intensity forms a curved line where a decrease rate of the luminous intensity at a starting point is large and a decrease rate gradually decreases toward an end point of the third section.

2. The lighting control apparatus for a vehicular turn signal lamp according to claim 1,
   wherein the predetermined cycle is set between 0.5 seconds and 1 second.

3. The lighting control apparatus for a vehicular turn signal lamp according to claim 2,
   wherein, in the first section, the luminous intensity changes from the lowest value to the highest value in the length of time equal to or less than one millisecond.

4. The lighting control apparatus for a vehicular turn signal lamp according to claim 3,
   wherein the total length of time of the first section and the second section is set equal to or greater than 40 milliseconds.

5. The lighting control apparatus for a vehicular turn signal lamp according to claim 2,
   wherein the total length of time of the first section and the second section is set equal to or greater than 40 milliseconds.

6. A vehicular lamp system comprising:
   the lighting control apparatus according to claim 2, and a light source controlled by the lighting control apparatus.

7. The vehicular lamp system of claim 6, wherein the vehicular lamp system is a vehicular turn signal lamp system.

8. The lighting control apparatus for a vehicular turn signal lamp according to claim 1,
   wherein, in the first section, the luminous intensity changes from the lowest value to the highest value in the length of time equal to or less than one millisecond.

9. The lighting control apparatus for a vehicular turn signal lamp according to claim 8,
   wherein the total length of time of the first section and the second section is set equal to or greater than 40 milliseconds.

10. The lighting control apparatus for a vehicular turn signal lamp according to claim 1,
    wherein the total length of time of the first section and the second section is set equal to or greater than 40 milliseconds.

11. A vehicular lamp system comprising:
    the lighting control apparatus according to claim 1, and a light source controlled by the lighting control apparatus.

12. The vehicular lamp system of claim 11, wherein the vehicular lamp system is a vehicular turn signal lamp system.

13. A lighting control apparatus for a vehicular turn signal lamp for controlling the flashing of a light source used as a vehicular turn signal lamp having a semiconductor light emitting device comprising:
    a control part configured to generate and output a control signal indicating luminous intensity of light emitted from the light source and
    a light source driving part configured to drive the light source based on the control signal provided from the control part,
    wherein the light emitted from the light source driven by the light source driving part based on the control signal repeats a predetermined luminous intensity change pattern at a predetermined cycle, and
    wherein the predetermined luminous intensity change pattern comprises:
    (i) a first section where the luminous intensity is substantially increased instantaneously from a lowest value to a highest value,
    (ii) a second section following the first section where the luminous intensity is maintained at the highest value,
    (iii) a third section following the second section where the luminous intensity is gradually decreased from the highest value to the lowest value, and
    (iv) a fourth section following the third section where the luminous intensity is maintained at the lowest value, and
    wherein the length of time of each section is the third section>the fourth section>the second section>the first section, and
    wherein the third section where a change in luminous intensity forms a curved line where a decrease rate of the luminous intensity at a starting point is large and a decrease rate gradually decreases toward an end point of the third section.

* * * * *